March 6, 1951 C. L. UMPHLETTE ET AL 2,543,881
FLOATING REEL SEAT FOR FISHING RODS
Filed Oct. 11, 1948
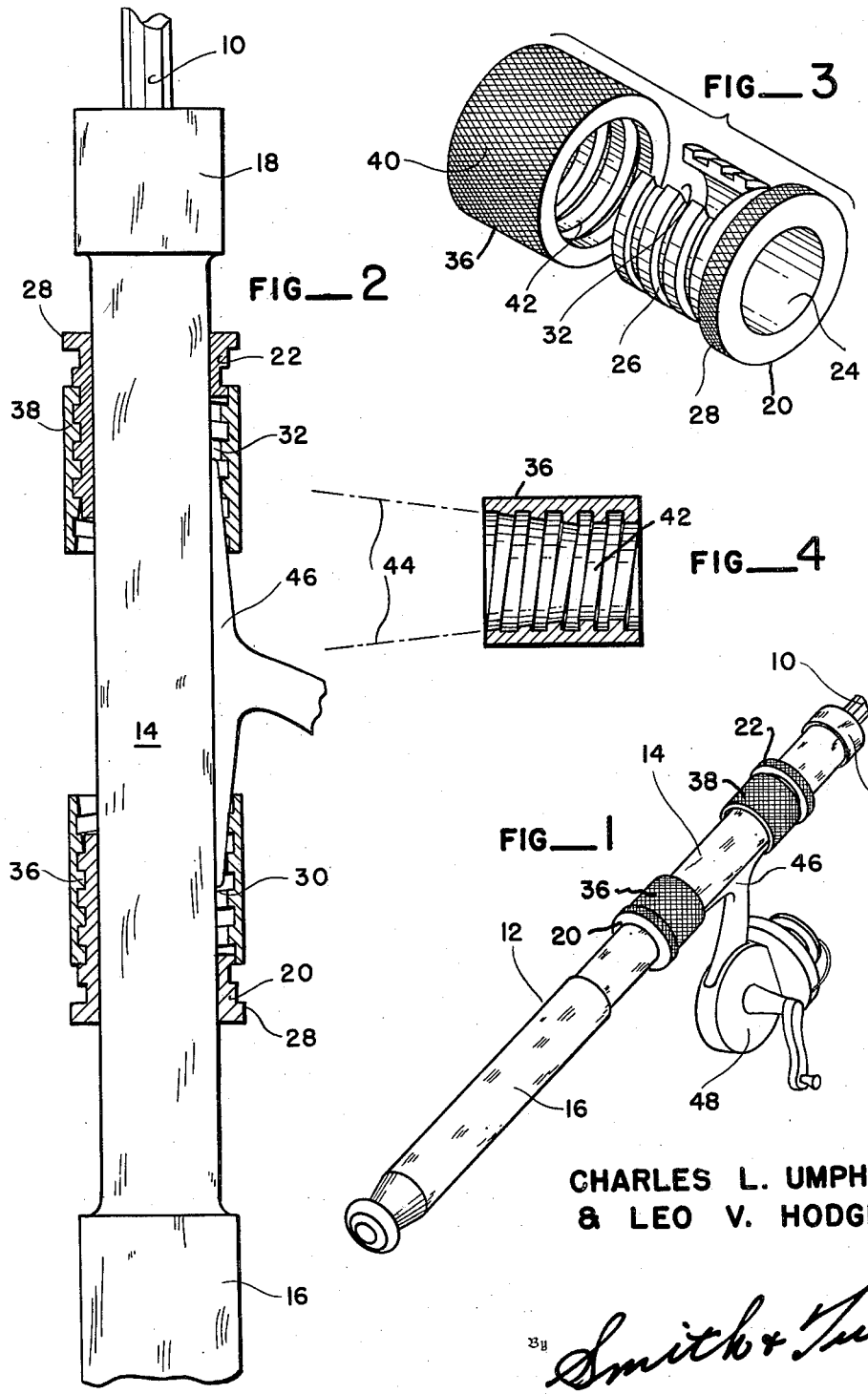
CHARLES L. UMPHLETTE
& LEO V. HODGEBOOM
Inventor
By Smith & Tuck
Attorney Patented Mar. 6, 1951

2,543,881

UNITED STATES PATENT OFFICE 2,543,881

FLOATING REEL SEAT FOR FISHING RODS

Charles Leonard Umphlette, Bellevue, and Leo Vernon Hodgeboom, Kirkland, Wash.

Application October 11, 1948, Serial No. 53,856

3 Claims. (Cl. 43—22)

1

Our present invention relates to the general art of fishing rods, and more particularly to a floating reel seat for fishing rods.

For many years the jointed fishing rod, particularly those made from glued-up strips of bamboo were so expensive, as custom made rods, that they were used only by the few fortunate fishermen who could afford their high cost. However, during the past fifty years there has been an increasingly widespread use of the jointed fishing rod, and with this widespread use has come into being a great variety of fishing rods, each adapted to a particular type or style of fishing and likened in their strength to the type of fish it is intended to engage. Almost without exception, however, all these rods that were adapted for a spool-type fishing reel were characterized by having a reel seat which positioned the reel at an exact spot. This has always been a disadvantage in that it was difficult for a particular person having a certain strength in their wrist to obtain the nicety of balance which would give them the maximum casting ability with the particular rod. In the past, about the only alternate available once the rod was decided upon was to experiment with reels of different weights in order to achieve this balance. This, however, was merely a round-about way to the end result and never fully achieved the same.

In our present reel seat we have constructed a reel seat which we term a "floating" seat, in that it can be positioned at any point along the length of a cylindrical reel seat, which in this case is normally of reduced diameter. This floating action is achieved by employing two clamping members, which are oppositely positioned, and engage a reel between them. Each of the two clamp members is provided with an inner and outer sleeve, so that when the desired longitudinal position of the reel upon the reel seat has been determined, the two clamp members are then moved toward the reel and established in fixed clamped position by means built into the two companion sets of clamping sleeves.

With the foregoing construction we have achieved the nicety of balance which permits the maximum casting ease. It is possible to vary the position of the reel, and thus reels of different sizes or types may be employed, and so shifted to give the desired balance found to be necessary. It has further been found that this form of reel seat is readily adapted to practically all forms of positions. It may be used on various types of casting rods; it is particularly adapted to spinning rods, whether used with light lures and

2 lines for fresh water fishing, or whether used with heavier gears for salt water fishing where large fish are engaged. Owing to the fact that the gripping of the reel is achieved by two members which can be placed at any position along the cylindrical grip, our floating reel seat is therefore able to accommodate all forms of fishing reel bridges without regard to their overall length.

A further object of our invention is to provide a fishing rod seat made from two clamping members, each of which have two parts, but which companion half members are of identical construction. This admits of considerable saving in manufacturing costs and reduces the number of parts that the service agency must maintain in order to service a reel seat which may have become damaged or broken through use.

Further objects, advantages and capabilities will be apparent from the description and disclosure in the drawings, or may be comprehended or are inherent in the device.

In the drawings:

Figure 1 is a perspective view showing one form of reel seat especially adaptable to our reel seat and showing a spinning type of fishing reel placed thereon.

Figure 2 is a longitudinal view of a portion of Figure 1 with the reel seat clamping members shown in section to better illustrate the manner in which they engage the bridge of a reel.

Figure 3 is a bracketed, exploded view, in perspective, showing the two members which make up a clamp unit of our reel seat.

Figure 4 is a cross-sectional view through the outer sleeve member of our clamp unit and shows the conical bore formed at one end of the reel for clamping purposes.

Referring to the drawings, throughout which like reference characters indicate like parts, we have elected to illustrate our invention as used on the spinning rod type of rod grip or handle. We have found, however, that our floating reel seat can be adapted to practically every form of fishing, and the various forms of reels used in those different forms of fishing, or which may be the fancy of individual fishermen.

The numeral 10 designates the rod proper. This may be formed after any of the recognized manner of a fishing rod, such as those made of strips of bamboo, which are joined together by gluing and wrapping of same, or it may be applied to the various other types of wood or metal rods or to the various forms of built-up plastic rods. In any event, however, the rods proper should extend, preferably, entirely through the grip designated generally by the reference character 12. Rod grips are made in various ways, such as using a solid piece of wood which is turned to the forms desired, or a more common form for light rod construction is to employ a plurality of cork washers, which are glued in place together, and also glued to the rod 10.

Our floating reel seat entails the use of at least a portion of the rod, as 14, which is formed cylindrical throughout the length that it may be desired to adjustably position the reel. In some cases, as in spinning rods and the like, the entire handle may be cylindrical from end to end. A more preferred form appears to be that illustrated in Figures 1 and 2 in which the cylindrical portion is of reduced diameter, leaving the lower hand grip portion 16 and a stop or resting member 18 at the upper end of the rod of increased diameter. Stop 18 may be extended to form an upper grip, particularly in the case of heavy casting rods where two handed operation is desirable.

Slidably disposed upon the cylindrical portion, as 14, of the rod grip are the two oppositely faced, but identical sliding inner sleeve members 20 and 22. The inner bore 24 of members 20 and 22 should be of sufficient size that a free sliding engagement is made with the cylindrical portion of 14. On their outer surface a, preferably, square or Acme thread is cut throughout the length, excepting for a portion of increased diameter which forms a turning ring #28 and is preferably knurled so that it may be held against rotation, particularly during the initial clamping operations. Each sleeve 20 and 22 is provided with a cut-out portion or bridge receiving notch, as 30 and 32. This notch should extend substantially half-way up the reduced diameter sleeve portion, and should have a width equal to the general type of reel it is to be used with. It is generally found that reels intended for fly fishing, for instance, have a common width of bridge, and same follows through the range of spinning and casting and bait reels. The purpose of having this positioning notch a reasonably snug fit on the reel bridge is to more positively anchor it in place, instead of relying entirely on friction. It will naturally follow, however, that the frictional engagement of the bridge itself on to the resilient material from which the cylindrical portion 14 is made, serves quite adequately to position the reel in most cases. However, for the greatest nicety of construction, a reasonably close tolerance is desirable in the width of notches 30 and 32.

Adapted to co-act with the interior sleeves 20 and 22 are the exterior sleeves 36 and 38. These sleeves, inasmuch as they are used as clamping nuts in effect, are knurled on their outer surfaces as indicated at 40. However, this knurling may be in narrow or wide bands, or the entire surface covered as illustrated. Interiorly, the bore of sleeves 36 and 38 have cut in them a co-acting thread adapted to form a workable fit with threads 26. This is shown at 42. In manufacture, this thread normally extends clear through sleeves 36 and 38, so that the sleeves can be positioned at any point on threads 26 of sleeves 20 and 22. However, to provide the gripping or clamping action that is so essential in our operation, we provide that the inner ends of the threads of sleeves 36 and 38 are tapered bored. This is probably best illustrated in Figure 4, where the included angle taper as shown by the dot-and-dashed lines 44, should be based upon the angles which, according to the various materials used, are shown by convention hand-books to form locking engagement. This characteristic is found very desirable, but at times must be departed from when reel bridges, having an extreme taper are encountered, it being desirable that this conical bore or taper match rather closely the taper of the bridge member 46 of the fishing reel 48.

Method of use

In using our floating reel seat, the clamp units, each of which consists of an inner and outer sleeve member, are moved to the opposite ends of the cylindrical portion 14, and during this initial stage the sleeves 36 and 38 should be screwed home against the flanges 28 of the inner sleeves 20 and 22. The reel is then put in an estimated position of balance, and the two clamp units are then slid toward the reel with the ends of the reel bridge 46 engaged in the positioning slot 30 and 32 of the inner sleeves. Each of the clamp members should then be pressed firmly into engagement with the bridge 46. Normally, in this position the fisherman can then test his reel and pole assembly for balance and easily correct the balance by shifting it up or down the reel seat portion 14. When the correct position has been determined he then tightens up the two clamping members. This is normally achieved by holding the rim 28 with one hand and grasping the outer sleeve with the other, and turning the outer sleeve so that it moves away from flange 28, and toward the reel. This causes the taper bore in the sleeves to engage the taper of the reel bridge, or to be forced up upon the reel bridge which may not be tapered. As soon as one clamp member has been snugly but not forceably tightened, the companion clamp member is similarly tightened upon the reel bridge. After both of the clamp members have been given this initial tightening they can both then be adjusted so that they have the same pressure and will thus hold the reel firmly in locked position upon the cylindrical portion 14 of the rod handle.

It is believed that it will be clearly apparent from the above description and the disclosure in the drawings that the invention comprehends a novel construction of a floating reel seat for fishing rods.

Having thus disclosed the invention, we claim:

1. A floating reel seat for fishing rods adapted for use on a cylindrical fishing rod handle or a handle having a cylindrical portion, comprising: two oppositely faced clamping units; each clamping unit having a cylindrical inner sleeve adapted to be slidably positioned on the cylindrical portion of the rod handle; said inner sleeve having exterior coarse pitched threads on its outer surface, said inner sleeve having a grip portion formed on the outer end of a greater diameter than the extreme diameter of the threads, and said inner sleeve having a notch through the inner end adapted to engage the sides of a fishing reel bridge; and each clamping unit having a cylindrical outer sleeve having a knurled outer surface and a threaded interior bore, said threaded bore being adapted to operatively engage the exterior threads of said inner sleeve, and the inner end portion of said threaded bore being outwardly coned at a slight angle to form an engaging surface for slidably engaging the bridge of a fishing reel.

2. A floating reel seat for fishing rods adapted for use on a cylindrical fishing rod handle or a handle having a cylindrical portion, comprising: two oppositely faced clamping units; each clamping unit having an inner sleeve adapted to be slidably positioned on the cylindrical portion of the rod handle; said inner sleeve having exterior threads on the outer surface, said inner sleeve having a grip portion formed on the outer end of said sleeve, and said inner sleeve having a notch through the inner end adapted to engage the sides of a fishing rod bridge; and each clamping unit having an outer sleeve having a threaded interior bore, said threaded bore being adapted to operatively engage the exterior threads of said inner sleeve, and the inner portion of said threaded bore being outwardly coned to form an engaging surface for securely engaging the bridge of a fishing reel.

3. A floating reel seat for fishing rods adapted for use on a cylindrical fishing rod handle or a handle having a cylindrical portion, comprising: two oppositely faced clamping units; each clamping unit having a cylindrical inner sleeve, one of which is adapted to be slidably positioned on the cylindrical portion of the rod handle; said inner sleeve having exterior threads on the outer surface, said inner sleeve having a grip portion formed on the outer end of said sleeve, and said inner sleeve having a notch through the inner end adapted to engage the sides of a fishing rod bridge; and each clamping unit having a cylindrical outer sleeve having a threaded interior bore, said threaded bore being adapted to operatively engage the exterior threads of said inner sleeve, and the inner portion of said threaded bore being outwardly coned to form an engaging surface for securely engaging the bridge of a fishing reel.

CHARLES LEONARD UMPHLETTE.
LEO VERNON HODGEBOOM.

REFERENCES CITED

The following references are of record in the file of this patent:

UNITED STATES PATENTS

| Number | Name | Date |
| --- | --- | --- |
| 402,594 | Hook | May 7, 1889 |
| 1,837,623 | Mansfield | Dec. 22, 1931 |

FOREIGN PATENTS

| Number | Country | Date |
| --- | --- | --- |
| 196,216 | Great Britain | of 1923 |